Oct. 1, 1929.  H. M. FRIENDLY  1,730,002
CAR POSITION INDICATOR SYSTEM
Filed Nov. 15, 1920   2 Sheets-Sheet 1
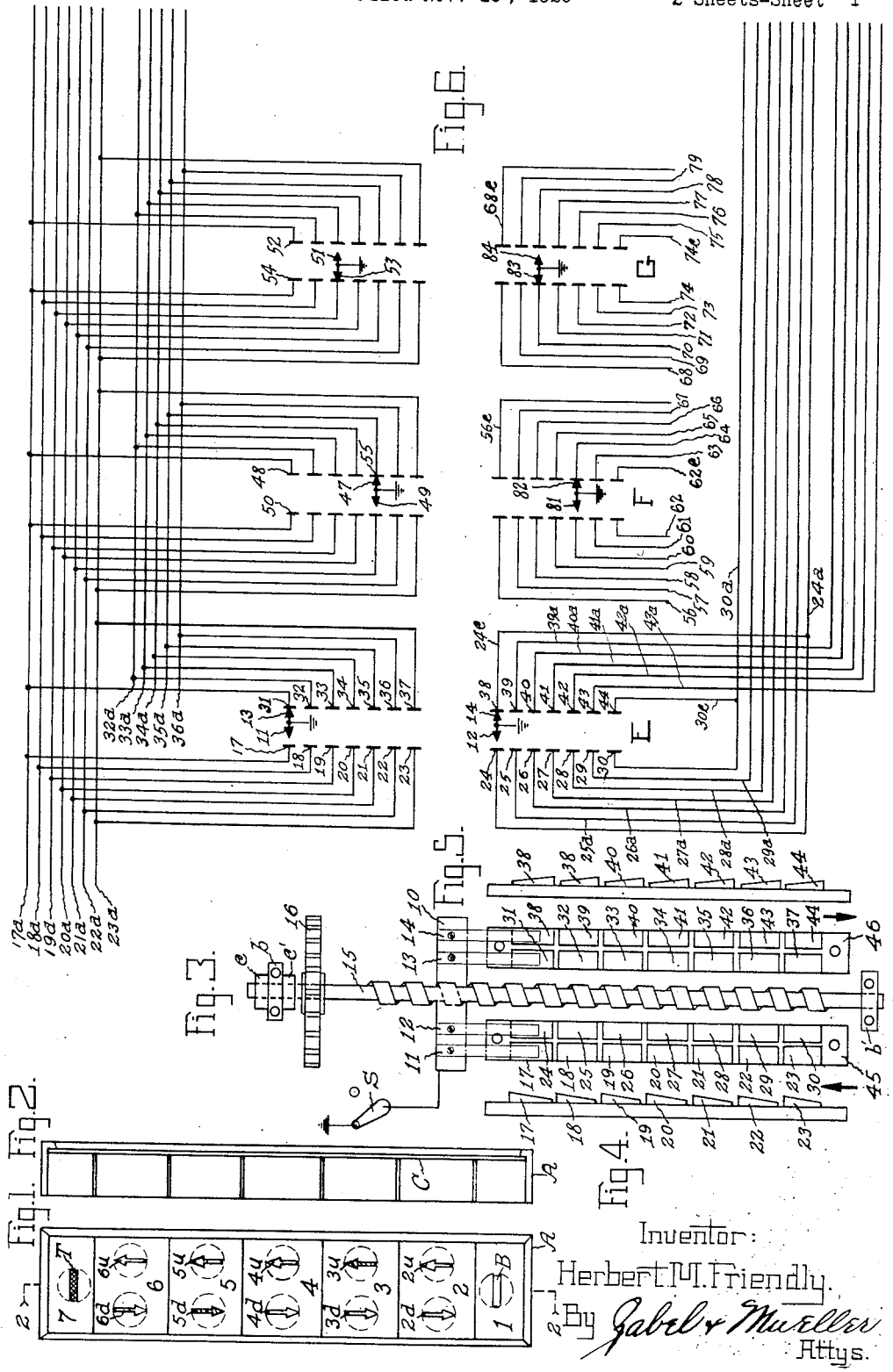
Inventor:
Herbert M. Friendly.
By Gabel & Mueller
Attys.

Patented Oct. 1, 1929

1,730,002

UNITED STATES PATENT OFFICE

HERBERT M. FRIENDLY, OF PORTLAND, OREGON

CAR-POSITION-INDICATOR SYSTEM

Application filed November 15, 1920. Serial No. 424,298.

My invention relates to an indicating means to visually represent the position or location of cars in a plurality of elevator shafts simultaneously on a single indicator, or on each of a plurality of indicators, and moreover to indicate the enroute direction of travel of the cars incidental to the indication. Other features of the invention, and the invention itself will be understood from the accompanying drawings and the descriptions thereof.

An object of the present invention is to provide an indicator in each car of a plurality of elevator shafts, and also at a point (or points) visible to parties waiting and to the starter or supervisor, whereby the elevator operators, those waiting and the starter may, by observing any of the indicators generally, know the relative position and enroute direction of all the cars in operation. That is to also say, while the relative positions of all the cars will be shown, whether standing still at the topmost or the lowermost floor, or enroute, the positions of the cars indicated will not necessarily show what cars are in the indicated positions. The latter is not material in practical operation, because it is usual in passenger elevator practice where a plurality of cars are employed to handle the traffic, to start the cars periodically or at least run them progressively so as to conduce to a uniform schedule of arrival and departure from the bottom (or main) and top floors. The cars, beginning at one side of the bank or group of elevators are, as a rule, scheduled to depart in numerical order, usually upon the sound of a periodic audible signal or by the supervisor instructing the elevator operator to start in each instance, either verbally or by signal.

While such arrangements as has heretofore been employed can, within certain limits, produce a more or less uniform schedule of arrival and departure, cars are often delayed by unusual traffic on a certain floor or floors. Thus, one or more cars may become delayed and thus destroy the uniformly progressive positions or distribution of the cars unknown to the supervisor in many instances and more or less unknown to the operators of the cars concerned. Indicators specific to each shaft and its car which denote the location of the cars (regardless of the direction of travel, unless a prolonged observation is taken) have been provided heretofore, but with these the supervisor must observe all the indicators and interpret the whole before he can decide when to dispatch the car awaiting his orders.

The indicator of the present invention where installed in a car does, however, specially indicate the position of the car in which it is mounted. This is accomplished preferably by reason of the signal indexing the car's enroute position glowing more brightly than the others, so the operator will not confuse the location of his own car with the others, when observing.

It will be manifest that where each operator has before him a vivid, luminous representation of the position of the cars and also their enroute direction he will be enabled to aid in maintaining the proper distribution of the cars in the group. For example, should he be detained enroute he will, by noting the relative positions of the other cars, with reference to his own (the latter being distinctive due to the brighter glowing of the lamp indicative of his car as hereinbefore adverted to), be enabled to adjust his position as quickly and as far as possible, perhaps by passing floor stop signals and leaving them to be recognized by following cars, or conversely, by slacking speed; this depending upon whether his car is ahead or behind of its proper position. Under certain conditions service would be expedited by a delayed car not proceeding to the topmost floor, but regaining its proper position by starting downward at an intermediate point. This might occur in early morning rush hours when there would be little object in going to the top floor, most passengers entering the building and leaving the cars at intermediate floors. The close co-operation possible between the various operators and the supervisor, gained through the employment of the present invention, will conduce to insure the most uniform service with the least responsibility and effort devolving upon the supervisor and the least charge of care on the part of the operators.

Referring now to the drawings:

Fig. 1 is a front elevation of the indicator of a seven-floor installation;

Fig. 2 is a sectional view of the indicator along line 2—2 of Fig. 1;

Fig. 3 is a semi-schematic representation of the commutator or controller of the present invention;

Fig. 4 is an edge plan view of the left segment assembly of the commutator;

Fig. 5 is an edge plan view of the right segment assembly of the commutator;

Figure 7:
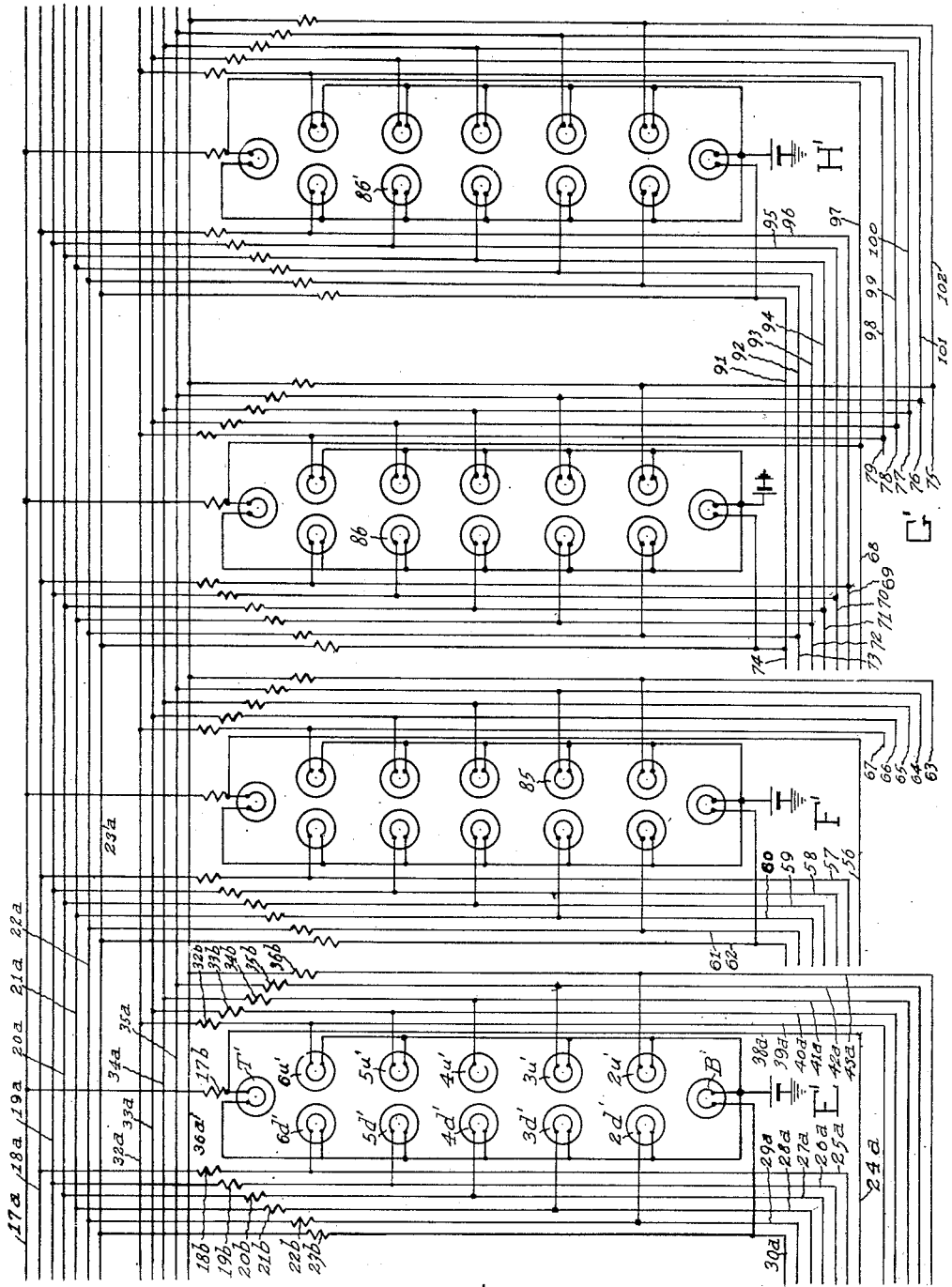

Fig. 6 is a partial schematic wiring layout of the system contemplated in the present invention, and it attaches to the left of sheet 2, the lines extending towards the right margin registering with those extending towards the left margin of sheet 2, and Fig. 7 shows the schematic wiring of the lamps of four indicators and attaches to the right of sheet 1, the lines extending towards the left margin of sheet 2 joining the lines extending towards the right margin of sheet 1.

Referring to Fig. 1, A is an indicator-containing box. 1 to 7 inclusive are metal plates having light orifices in same. In plates 1 and 7 (corresponding to floors 1 and 7) the light orifices B and T respectively are rectangular, disposed horizontally. Plates 2 to 6 inclusive (corresponding to floors 2 to 6 inclusive) each have two arrow-shaped orifices pointing vertically in opposite directions. The arrow-shaped orifices pointing upward are designated $2^u$ to $6^u$ inclusive. Lamps B' and T' and $2^{d'}$ to $6^{d'}$ inclusive and $2^{u'}$ to $6^{u'}$ inclusive (the group designated E') are located in compartments or screened lamp enclosures behind the orifices B and T and $2^d$ to $6^d$ and $2^u$ to $6^u$ inclusive, respectively. Thus, should lamps T', $3^{u'}$ and $5^{d'}$ glow, for example, (as will be presently manifest ensues under the represented state) a lighted upward-pointing arrow-shaped signal will be observable at $3^u$; a lighted downward-pointing arrow-shaped signal will be observable at $5^d$ and a lighted rectangular-shaped signal will be observable at T. The indication will thus be that of a car standing at the top (seventh) floor, and a car moving in a downward direction at (or near) the fifth floor and a car moving in an upward direction at (or near) the third floor. The foregoing refers to lamp group E located, for example, in the car of shaft No. 1. A similar containing or indicator box is provided for each lamp group F', G' and H', located in the car of shaft No. 2, the car of shaft No. 3 and at any point observable to the supervisor, respectively.

It is thus contemplated in the exampled installation that each of the three elevator cars assumed as constituted in the installation shall be provided with an indicator-box similar to Fig. 1, with a component set of lamps as shown in group E'. In addition, a similar indicator containing a set of component lamps shown in group H' is provided observable to the starter or supervisor, and in fact, other groups, for example, in multiple relation respectively with the lamps of group H' may be provided on each floor observable to parties waiting for cars. The lamps of group H' are in multiple with the lamps of group G' respectively, as will be discussed presently.

The present invention contemplates its use as supplemental to an elevator signal system of the class and general type set forth in U. S. Letters Patent No. 634,220, granted to James B. Smalley and Charles A. Reiners, co-inventors, October 3, 1899, though, of course, the present invention may be employed independently, since no inherent co-relation of the systems exist, beyond the desirable mechanical combination of the systems for engineering and economic reasons.

Fig. 3 may be assumed to represent a normally grounded brush-supporting arm 10 carrying four brushes 11, 12, 13 and 14 and which is driven along the screw-shaft 15 upon the said 15 being revolved. The said 15 has bearings $b$ and $b'$ and collars $c$ and $c'$.

With reference to the hereinbefore cited patent, the screw-shaft 15 may be assumed to correspond to H therein; the brush-supporting arm 10 to I therein; brushes 11 to 14 inclusive to $k^4$, $k^5$, $k^2$ and $k^1$ respectively therein; the sprocket-wheel 16 to H' therein. The segments or plates 17 to 23 inclusive, 24 to 30 inclusive, 31 to 37 inclusive and 38 to 44 inclusive are engageable to brushes 11 to 14 respectively. These segments are secured to insulating mountings 45 and 46. The said segments may be assumed as mounted in the general manner as are segments 1 to 6 inclusive of Fig. 5 of the said cited patent, for example, though, of course, were the present invention to be incorporated with the signal system contemplated in the said cited patent additional segments and brushes as contemplated in the present invention must be provided supplementary thereto on the brush-arm I of the cited patent.

It has been stated hereinbefore that the exampled system of the present invention consists of three elevator shafts and cars therein. Each shaft has a commutator device incorporating wipers and segments as shown in Fig. 3, the latter corresponding to schematic commutator group E of Fig. 6. This is bearing in mind that commutator groups F and G each similarly represent such a commutator device, each individual to an elevator shaft. That is to say, schematic commutator groups E, F, and G are to be assumed as belonging to elevator shafts No. 1, No. 2 and No. 3 respectively, and that the contact brushes of the said commutators are directly controlled by the movement of the elevators of the respective shafts in like manner.

In Fig. 3 wipers 13 and 14 are assumed to be in engagement with segments 31 and 38, and therefore wipers 11 and 12 are free. That is to say, when the wipers move in a downward direction driven by the screw-shaft 15 wipers 13 and 14 are in engagement with segments of the right sets of segments, and when wipers move in an upward direction driven by the screw-shaft wipers 11 and 12 are in engagement with segments of the left set of segments. The mechanical arrangement whereby the wipers are engaged and disengaged from specific sets of segments according to the direction of rotation of the screw-shaft 15 is fully set forth in the said cited patent, and this arrangement applies to Fig. 3 of the present invention.

The segments of Figs. 3, 4 and 5 are given a slope on their faces (somewhat exaggerated in Figs. 4 and 5) so a brush will not engage adjacent segments simultaneously and thus cause two lamps to glow as the brush passes from one segment to another. Two lamps glowing might be confusing and lead the observer to assume two cars were at the indicated location (adjacent floors) whereas but one car only would be concerned.

Referring again to the schematic circuit drawings Figs. 6 and 7 it will appear that the segments (shown schematically) of the three commutator devices E, F and G corresponding to segments 17 to 23 and 31 to 37 inclusive are in multiple respectively to common conductors $17^a$ to $23^a$ inclusive and $17^a$, $32^a$ to $36^a$ inclusive. Further, that the segments 17 and 31 of E and the corresponding segments of F and G are in multiple relation with the free terminals of the lamp T' and the corresponding lamps of groups F', G' and H' over conductor $17^a$; one terminal of all lamps on the groups being attached to grounded battery. Similarly, segments 23 and 37 of group E and the corresponding segments of F and G are in multiple relation with the lamp B' and the corresponding lamps of groups F', G' and H' over conductor $23^a$. Also, that segments 18 to 22 and 32 to 36 inclusive of group E and the corresponding segments of F and G are in multiple relation respectively and also with lamps $6^{d'}$, $5^{d'}$, $4^{d'}$, $3^{d'}$, $2^{d'}$ over conductors $18^a$ to $22^a$ inclusive and $6^{u'}$, $5^{u'}$, $4^{u'}$, $3^{u'}$, $2^{u'}$ over conductors $32^a$ to $36^a$ inclusive respectively. Further, that the said lamps in group E' are in multiple with corresponding lamps in groups F', G' and H' respectively. That is to say, if any lamp in group E' is caused to glow, the corresponding lamp in each group F', G' and H' will also glow.

It will be thus manifest that if brush 13 applies its ground to segment 31 or if brush 11 applies its ground to segment 17 lamp T' and its multipled lamps will glow. The same condition would ensue if brush 47 were in engagement with segment 48 or if brush 49 were in engagement with segment 50, or if brush 51 were in engagement with segment 52, or if brush 53 were in engagement with segment 54. It may be stated here that as to which said brush will engage with a topmost segment of any group in any instance will depend upon whether the elevator stopped when it reached the topmost floor or went slightly past and returned to it. This engagement of one or the other of the topmost segments, however, has no special operative effect, since both of the topmost segments of each group are in multiple relation. The same applies to the bottommost segment with relation to causing lamp B' and the corresponding lamps of groups F', G' and H' to glow when the car stops at the lowermost floor. In a similar way, were brush 13 in engagement with segment 35 the same glowing effect of lamp $3^{u'}$ and the corresponding lamps of the groups F', G' and H' will ensue as when segment 55 of group F is engaged by brush 47 as shown in the drawing. Then it is further manifest that the corresponding lamps of the groups E', F', G', and H' will be caused to glow from the wipers of the commutator groups E, F, and G as whenever a wiper is applied to a segment of either group E, F or G it applies a ground to the free terminal of the corresponding lamps of the groups E', F', G' and H' over its attached common conductor.

It follows from the foregoing paragraph that the commutator of any group E, F and G (the commutators being like in Fig. 3) is equally adapted to cause a glowing of the multipled indicator lamps, and further, since the commutator device simply applies ground potential to the various common conductors $17^a$ to $23^a$ inclusive and $32^a$ to $36^a$ inclusive the glowing of any and all lamps connected in multiple to a common conductor will be of the same intensity regardless of how many commutator devices apply ground potential to a said common conductor. Therefore, the glowing of a lamp on an indicator will index only that some one (or more) of the cars is (or are) at the indicated floor, but which car (excepting as will be seen presently) is not evident, nor is it usually essential that this latter fact be known, in view of the usual order of operation, wherein numerical sequence of starting from the dispatching or main floor is practiced.

It will be noted that resistances $17^b$ and $23^b$ are included between common conductors $17^a$ and $23^a$ and the top and bottom lamps T' and B' respectively. Also, it will be noted that resistances $18^b$ to $22^b$ inclusive are included between common conductors $18^a$ to $22^a$, inclusive, and the "down" lamps $6^{d'}$, $5^{d'}$, $4^{d'}$, $3^{d'}$ and $2^{d'}$ respectively of group E'. Also that resistances $32^b$ to $36^b$ inclusive, are included between the common conductors 32$^a$ to 36$^a$ inclusive, and the "up" lamps 6$^{u\prime}$, 5$^{u\prime}$, 4$^{u\prime}$, 3$^{u\prime}$ and 2$^{u\prime}$ respectively of group E$^\prime$. It will be further noted that the connections from the corresponding lamps of the other groups F$^\prime$, G$^\prime$ and H$^\prime$, to the said common conductors also include a similar resistance. The object of the resistances is to obstruct the current flow to the concerned common conductor when it constitutes ground potential as hereinbefore set forth, so the lamps multipled therewith through the said resistances will glow with a subnormal brightness. The foregoing assumes all lamps to be of the same luminous intensity rating and adapted to the same voltage.

Conductors 25$^a$ to 29$^a$ inclusive, lead to segments 25 to 29 inclusive, of group E to the free terminals of lamps 6$^{d\prime}$, 5$^{d\prime}$, 4$^{d\prime}$, 3$^{d\prime}$, and 2$^{d\prime}$ of group E$^\prime$ respectively; conductors 39$^a$ to 43$^a$ inclusive, lead from segments 39 to 44 inclusive, of group E to the free terminals of lamps 6$^{u\prime}$, 5$^{u\prime}$, 4$^{u\prime}$, 3$^{u\prime}$ and 2$^{u\prime}$ of group E$^\prime$ respectively. Also conductors 24$^a$ (and its tap to segment 38) and conductor 30$^a$ (and its tap to segment 44) lead from segments 24 and 30 of group E to the free terminals of lamps T$^\prime$ and B$^\prime$ of group E$^\prime$ respectively. Likewise, conductors 56 to 67 inclusive of group F attach to similarly designated conductors in Fig. 7, and conductors 68 to 79 inclusive, of group G attach to similarly designated conductors in Fig. 7. Conductors or taps 56$^c$ and 62$^c$ of group F attach to conductors 56 and 62 respectively. Also, conductors or taps 68$^c$ and 74$^c$ of group G attach to conductors 68 and 74 respectively. The connections of the respective conductors to the respective segments of groups E, F and G are alike.

It will thus be manifest that segments 24 to 30 inclusive, 38 to 44 inclusive, of group E and the corresponding segments of each of groups F and G, independently attach to the free terminals of corresponding lamps in groups E$^\prime$, F$^\prime$ and G$^\prime$ respectively, the free terminals of the lamps of H$^\prime$ being in multiple with the free terminals of the corresponding lamps of G$^\prime$.

Bearing in mind that brushes 11 and 12 coincidently engage companion segments 17 and 24, and other companion segments consecutively as the brush-supporting arm 10 moves downwardly, driven by the screw-shaft 15 and that brushes 13 and 14 coincidently engage companion segments 37 and 44, and other companion segments consecutively as the said brush-supporting arm moves upwardly driven by the said screw-shaft, it will be manifest that as brush 13 applies ground potential to segments 37 to 31 inclusive it will thereby apply ground potential to the attached conductors 23$^a$, 36$^a$ to 32$^a$, 17$^a$; each said conductor leading as a common conductor (through the described individual resistances) to the free terminals of the lamps B$^\prime$, 2$^{u\prime}$, 3$^{u\prime}$, 4$^{u\prime}$, 5$^{u\prime}$, 6$^{u\prime}$ and T$^\prime$ respectively, of group E$^\prime$, successively, as well as to the free terminals of the corresponding lamps of the groups F$^\prime$, G$^\prime$, and H$^\prime$. The said successively grounded lamp terminals imply the coincident glowing of the said lamps respectively.

It has been set forth hereinbefore that resistances are included in the taps from the said conductors 23$^a$, 36$^a$ to 32$^a$, 17$^a$ to the free terminals of the lamps B$^\prime$, 2$^{u\prime}$, 3$^{u\prime}$, 4$^{u\prime}$, 5$^{u\prime}$ and T$^\prime$ (and the respectively multipled lamps of groups F$^\prime$, G$^\prime$ and H$^\prime$) respectively, and that the said lamps will glow with subnormal intensity by reason of the included resistances. Also, that brush 14 (companion to brush 13) applies ground potential to each of the conductors 24$^a$, 39$^a$ to 43$^a$, 30$^a$ coincidently with the brush 13 applying ground potential to each of the conductors 23$^a$, 36$^a$ to 32$^a$, 17$^a$, respectively.

It will likewise be manifest that as the said brush-supporting arm 10 moves downwardly as set forth, brush 11 will then apply ground potential to segments 17 to 23 inclusive successively and the attached conductors 17$^a$ to 23$^a$ inclusive, each said conductor leading as a common conductor (through the described individual resistances) to the free terminals of lamps T$^\prime$, 2$^{d\prime}$, 3$^{d\prime}$, 4$^{d\prime}$, 5$^{d\prime}$, 6$^{d\prime}$ and B$^\prime$ respectively of group E$^\prime$ successively, as well as to the free terminals of the corresponding lamps of the groups F$^\prime$, G$^\prime$ and H$^\prime$. The said successively grounded lamp terminals imply the coincident glowing of said lamps.

It has been set forth hereinbefore that resistances are included in the taps from the said conductors 17$^a$ to 23$^a$ inclusive, to the free terminals of the lamps T$^\prime$, 2$^{d\prime}$, 3$^{d\prime}$, 4$^{d\prime}$, 5$^{d\prime}$, 6$^{d\prime}$ and B$^\prime$ (and the respectively multipled lamps of the groups F$^\prime$, G$^\prime$ and H$^\prime$) respectively, and that the said lamps will glow with subnormal intensity by reason of the included resistances. Also that brush 12 (companion to brush 11) applies ground potential to each of the conductors 24$^a$ to 30$^a$ inclusive coincidently with the brush 11 applying ground potential to each of the conductors 24$^a$ to 30$^a$ inclusive, respectively.

It will now be clear that while brushes 11 and 13 cause the said lamps of each of groups E$^\prime$, F$^\prime$, G$^\prime$ and H$^\prime$ to coincidently glow with subnormal intensity, brushes 12 and 14 will cause the said lamps of group E$^\prime$ only to glow with normal intensity by reason of the said brushes 12 and 14 applying ground potential directly to the free terminals of the said lamps while the brushes 11 and 13 coincidently apply ground through the dimming resistances to the said lamps respectively. Thus, while the operation of the brushes 11 and 13 of commutator E causes lamps (glowing with subnormal brightness) of groups F$^\prime$, G$^\prime$, and H$^\prime$ to index the direction of enroute movement and the position of the car of shaft No. 1, the brushes 12 and 14 of commutator E will cause the said lamps of group E' (located in the car of shaft No. 1 as stated) to index the direction of movement and the position of the car of shaft No. 1; the position of the said car being indexed in group E' by the normal glowing of one of the indicator lamps only at a time, regardless of how many other lamps may be coincidently glowing in the said indicator, as will be clear presently, due to the fact that the position of the brushes 12 and 14 (with respect to engageable segments) are determined positively by the enroute direction and also the position of the car in the shaft No. 1 and further, that each of said latter two brushes, can, by reason of the construction of the commutator device as has been set forth, apply ground potential to only one segment at a time.

The glowing of the respectively multipled lamps of groups E', F', G' and H' depending upon ground potential being applied to the said common conductors 17$^a$ to 23$^a$ inclusive and 32$^a$ to 36$^a$ inclusive, and the fact these conductors are common to corresponding segments of the like commutator devices E, F, and G makes it clear that the lamps of groups E', F', G' and H' will glow in the same manner resultant to a ground applied from either said commutator device over any one or more of the said common conductors. That is further to say, a plurality of the said conductors may be grounded coincidently, and moreover, it is contemplated in the exampled system illustrated, that conductors 17$^a$, 34$^a$, and 19$^a$ are so grounded while car in shaft No. 1 is at floor seven; car in shaft No. 2 going up at floor three and car in shaft No. 3 is going down at floor five. Further, lamps T', 3$^{u'}$ and 5$^{d'}$ will respectively indicate this condition in group E' and its corresponding lamps will so indicate the same condition in group F', G' and H', observable to the respective operators in the shafts Nos. 2 and 3, and in the indicator visible to the supervisor respectively. However, due to the brush 14 of E; 82 of F and 84 of G, there will be three lamps T', 85 and 86, (and in addition lamp 86'; the latter in multiple with 86) which will all glow with normal brightness due to ground potential being applied directly to their respective free terminals, and these normal-glowing lamps will index to the respective car operators the position of his car.

It has been stated that lamp 86' of group H' is shown glowing with normal brightness. This is so the supervisor can readily know the location of the "pilot" car, which in the exampled instance is the car of shaft No. 3. He can then readily determine what car is in any other indicated location in view of the numerical order of departure of the cars from the main floor as hereinbefore adverted to. Of course, car No. 1 could be chosen for the pilot car, and this would usually be the case in practice. In case such change were to be introduced it would mean simply that in lieu of the free terminals of the lamps of group F' being multipled with the free terminals of the corresponding lamps in group G' over conductors 91 to 102 inclusive, these conductors would extend from group H' to the free terminals of the corresponding lamps of group E' in place of to the said lamps of group G' as shown.

From the foregoing it will appear that as many lamps will coincidently glow in each indicator as there are cars, though by opening switch S of Fig. 3 (not shown in the schematic drawings to avoid complexity) no operative effect can be introduced by the commutator device E. This switch would ordinarily be manipulated when a car is put out of commission so no lamp will index its location and confuse the indication of the operative cars.

It will appear that in lieu of using arrow-shaped orifices in front of the lamps in the indicators any other shape may be employed, or in fact, words or letters. I prefer the arrow-shaped orifices and rectangles shown as conveying a more lucid representation of the conditions. Obviously, in place of employing lamps, mechanical indicators may be used. And, moreover, as many shafts with their component commutator devices and as many car indicators and auxiliary indicators may be employed as the installation warrants. The number of segments and lamps may be increased or decreased to correspond to the number of floor divisions through which the cars operate.

The energizing current has been shown as derived from grounded battery. This has seemed the simplest way of illustrating, though it is manifest an ungrounded source of current wherein the brush-carrying arms may be applied to one of its poles and the common terminals of the lamps applied to the other is practicable.

It is apparent the brushes 12, 14, 81, 82, 83 and 84, together with their cooperating segments and attached conductors may be omitted, and still attain other salient objects of the present invention. Also, the resistance shown introduced between the conductors 17$^a$ and 23$^a$ inclusive and 32$^a$ to 36$^a$ inclusive and the various lamps may be omitted if the former omission is made, without negating other salient objects of the present invention.

It will be manifest that modifications of the present invention as disclosed in the exampled application hereinbefore illustrated and described may be widely practiced, adapting it for use in indexing the location of railway cars in a plurality of block sections of roadway, for example. Also that the invention may be otherwise employed, either as an amplification or employing it in part only without departing from its scope.

Having thus described the invention, what I claim as new is:

1. In a signaling system, the combination with a position indicator comprising a plurality of signaling devices, a plurality of moving cars, a control device associated with each car, means controlled by respective said control devices responsive to respective said car movement for operating said signal devices to signal the changing position of the respective cars, of another car, a control device therefor, and means controlled by last said control device responsive to the movement of said other car for operating said signaling devices in a different manner from first said control devices to distinctively signal the changing position of said other car.

2. In a signaling system, the combination with a position indicator comprising a plurality of lamps, a plurality of moving cars, a control device specific for and operated by each car, resistors adapted to be placed in a series circuit with each of said lamps, said control devices for commonly operating said lamps with a resistor serially included with each lamp to signal the changeable position of said cars coincidently, another car, a control device operated by and specific therefor, and means involving last said control device for operating one of said lamps at a time without its corresponding resistor in circuit to differently signal the position of said other car.

3. In a signaling system, the combination with a plurality of cars, means for moving said cars in different directions, a position indicator comprising a group of signaling devices for each direction in which said cars travel, means for operating signaling devices in various of said groups to indicate the movement and direction of travel of said cars, of another car, means for moving it in different said directions, a resistor for each of said signaling devices, and means operated responsive only to the movement of said other car for including resistors in circuit with different of said signaling devices to indicate the movement and direction of travel of said other car.

4. In a signaling system, the combination with a plurality of cars, a group of signaling devices in each car, means for moving said cars, a control device specific to and operated by the movement of each car, means responsive to the control device of the respective cars for operating corresponding said signaling devices of the said group in each of said cars to show the position of all of said cars on each group, and means operated by the control device of the specific cars for differently operating the signal device indicative of the position of the corresponding car only of the group of signal devices mounted in the corresponding car.

5. In a car position indicating system, the combination of a position indicator comprising a single set of signaling devices, a plurality of elevator cars, means automatically operated responsive to the movement of the respective cars for coincidently operating in one manner those of the said signaling devices corresponding to the positions of the respective cars, another car, and means for operating in a different manner that one of said signal devices corresponding to the position of the said other car.

6. In a car position indicating system, the combination of a position indicator comprising a single set of signaling devices, a plurality of elevator cars, means automatically operated responsive to the movement of the respective cars for coincidently operating in one manner those of the said signaling devices corresponding to the positions of the respective cars, another car, a resistor for each signal device, and means involving the corresponding resistor for operating in a different manner that one of said signal devices corresponding to the position of the said other car.

7. In a car position indicating system, the combination of a position indicator comprising a single set of signaling devices, a plurality of elevator cars, means automatically operated responsive to the movement of the respective cars for coincidently operating in one manner those of said signaling devices corresponding to the positions of the respective cars, another car, means for operating said another car into positions corresponding to the positions which may be occupied by any of said plurality of elevator cars, and means for operating in a different manner that one of said signal devices corresponding to the position occupied by the said other car.

8. In a car position indicating system, the combination of a position indicator comprising a plurality of signaling devices, a plurality of cars, a group of said signal devices specific to each direction of travel of the cars, means automatically operated responsive to the movement of the respective cars for coincidently operating in one manner those of said signaling devices corresponding to the positions of the respective cars and their respective direction of travel, another car, and means for operating in a different manner that one of said signal devices corresponding to the direction of travel and the position of the said other car.

9. In a car position indicating system, the combination of a position indicator comprising a plurality of signaling devices, a plurality of cars, a group of said signal devices specific to each direction of travel of the cars, means automatically operated responsive to the movement of the respective cars for coincidently operating in one manner those of said signaling devices corresponding to the positions of the respective cars and their respective direction of travel, another car, a resistor for each signal device, and means involving the corresponding resistor for operating in a different manner that one of said signal devices corresponding to the direction of travel and the position of the said other car.

10. In a car position indicating system, the combination of a position indicator comprising a single set of signaling devices, a plurality of cars, a plurality of positions for each car common with the other said cars, a said signal device for each of said common positions, means automatically operated responsive to the movement of the respective cars for coincidently operating in one manner those of said signaling devices corresponding to the positions of the respective cars, another car, and means for operating in a different manner that one of said signal devices corresponding to the position of the said other car.

11. In a car position indicating system, the combination of a position indicator comprising a single set of signaling devices, a plurality of cars, a plurality of positions for each car common with the other said cars, a said signal device for each of said common positions, means automatically operated responsive to the movement of the respective cars for coincidently operating in one manner those of said signaling devices corresponding to the positions of the respective cars, another car, a resistor for each signal device, and means involving the corresponding resistor for operating in a different manner that one of said signal devices corresponding to the position of the said other car.

12. In an elevator position indicator system, a plurality of elevator cars, a signal board for each said car, signal means for each board for indicating the relative positions of all the cars operated responsive to the movement of the respective cars, and means for differently operating the signal means of the respective cars whereby the indication on each board for the relative location of the car carrying it will be distinctive.

13. In a car position indicating system, the combination with a position indicator, of a single set of signaling devices in said indicator, a plurality of elevator cars, means automatically operated responsive to the movements of the respective cars for coincidently operating a corresponding number of said signaling devices to indicate the position of the respective cars, another car, means controlled by the movement of said another car for distinctively operating at random one of said signal devices with correspondence to the location of the car for differently operating said signaling devices to distinctively indicate the position of said other car.

In witness whereof, I hereunto subscribe my name this 12th day of November, A. D., 1920.

HERBERT M. FRIENDLY.